United States Patent [19]

Hagenbuch

[11] Patent Number: 5,102,198

[45] Date of Patent: Apr. 7, 1992

[54] METHOD FOR A UTILITY EXTENSION OF AN OFF-ROAD VEHICLE HAVING A DUMP BODY

[76] Inventor: LeRoy G. Hagenbuch, 4602 N. Rosemead Dr., Peoria, Ill. 61614

[21] Appl. No.: 769,585

[22] Filed: Oct. 2, 1991

Related U.S. Application Data

[63] Continuation of Ser. No. 238,725, Aug. 30, 1988, abandoned.

[51] Int. Cl.⁵ .............................................. B60P 1/04
[52] U.S. Cl. ................... 298/17 B; 298/17 SG; 293/118; 280/763.1
[58] Field of Search ............... 298/1 R, 17 B, 17 S, 298/17 SG, 17 T; 293/117, 118; 280/763.1

[56] References Cited

U.S. PATENT DOCUMENTS

| | | |
|---|---|---|
| 2,378,504 | 6/1945 | Roos . |
| 2,771,306 | 11/1956 | Ash . |
| 2,799,531 | 7/1957 | Vine ..................................... 298/1 R |
| 2,990,212 | 6/1961 | Nicastro ........................... 293/118 X |
| 3,421,793 | 1/1969 | Pioch ................................. 298/175 |
| 3,871,695 | 3/1975 | Koenig ................................. 293/118 |
| 3,891,239 | 6/1975 | Leo et al. . |
| 3,923,330 | 12/1975 | Viall, Sr. et al. ................ 298/1 R X |
| 4,026,590 | 5/1977 | Holm ................................. 298/1 R X |
| 4,105,237 | 8/1978 | Viall et al. ....................... 298/1 R X |
| 4,325,444 | 4/1982 | Anami .............................. 293/118 X |
| 4,361,342 | 11/1982 | Duffield . |
| 4,541,661 | 9/1985 | Hawk ................................... 293/117 |
| 4,542,913 | 9/1985 | Giesmann . |
| 4,715,610 | 12/1987 | Wisdom . |

FOREIGN PATENT DOCUMENTS

| | | | |
|---|---|---|---|
| 0931521 | 6/1982 | U.S.S.R. .......................... 298/17 SG |
| 799677 | 8/1958 | United Kingdom ........... 298/17 SG |

OTHER PUBLICATIONS

Undated brochure for "CUB" trailer by Columbia Trailer Co., Hillsboro, Oreg. 97124.

Primary Examiner—D. Glenn Dayoan
Attorney, Agent, or Firm—Leydig, Voit & Mayer

[57] ABSTRACT

A method for providing an extension to the frame of a heavy-duty, off-road vehicle such that the frame is accessible from the posterior area of the vehicle for pushing or pulling. By providing such an extension, the vehicle may pull or be pushed, pulled or bumped without risking damage to the body of the vehicle which typically overhangs the most rearward portion of the frame. In order to allow for rotation of the body to dump loads, the extension is operably coupled to the body and frame such that it is automatically rotated to an out-of-the-way position during the dumping of a load.

5 Claims, 3 Drawing Sheets

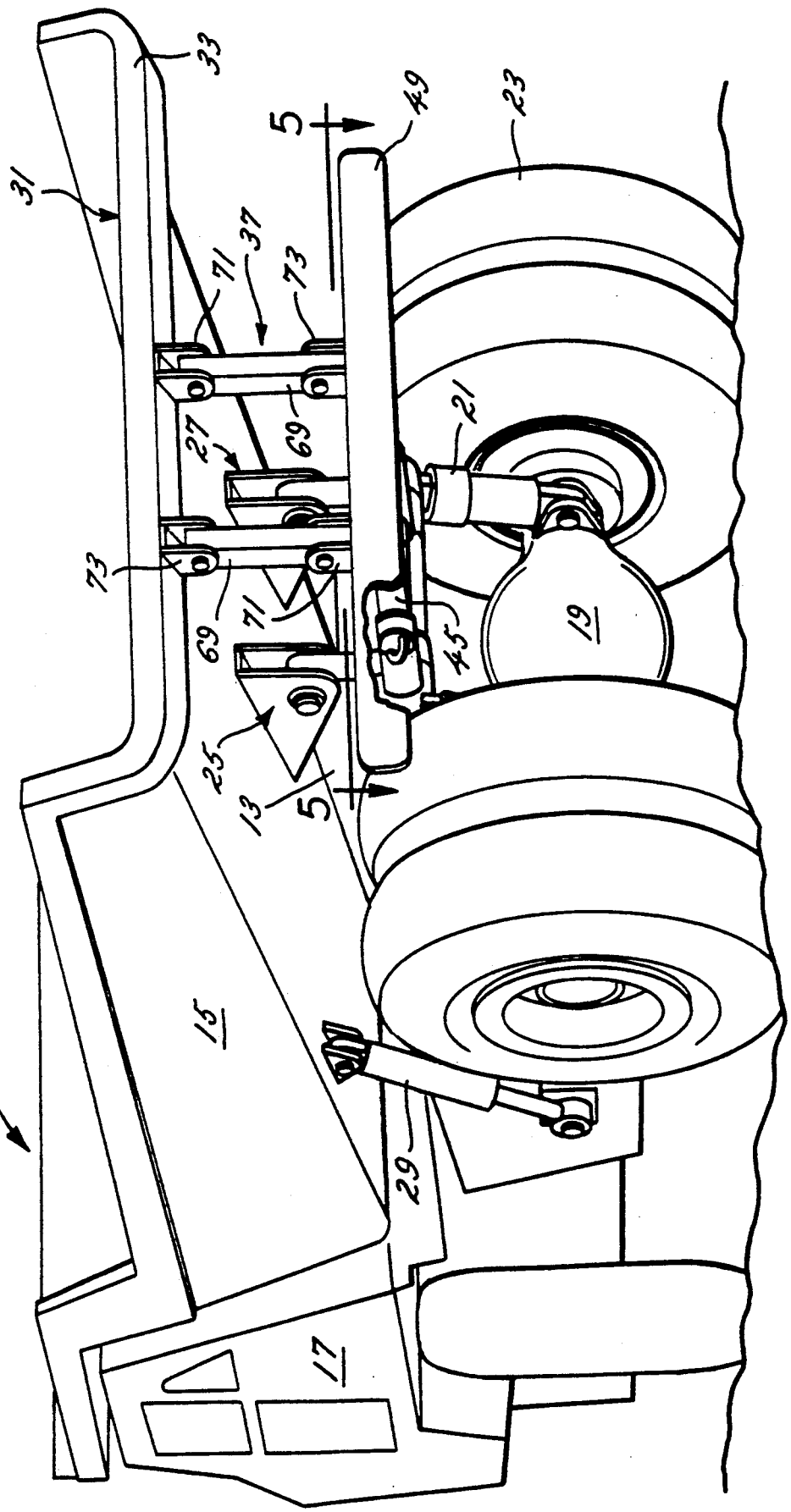

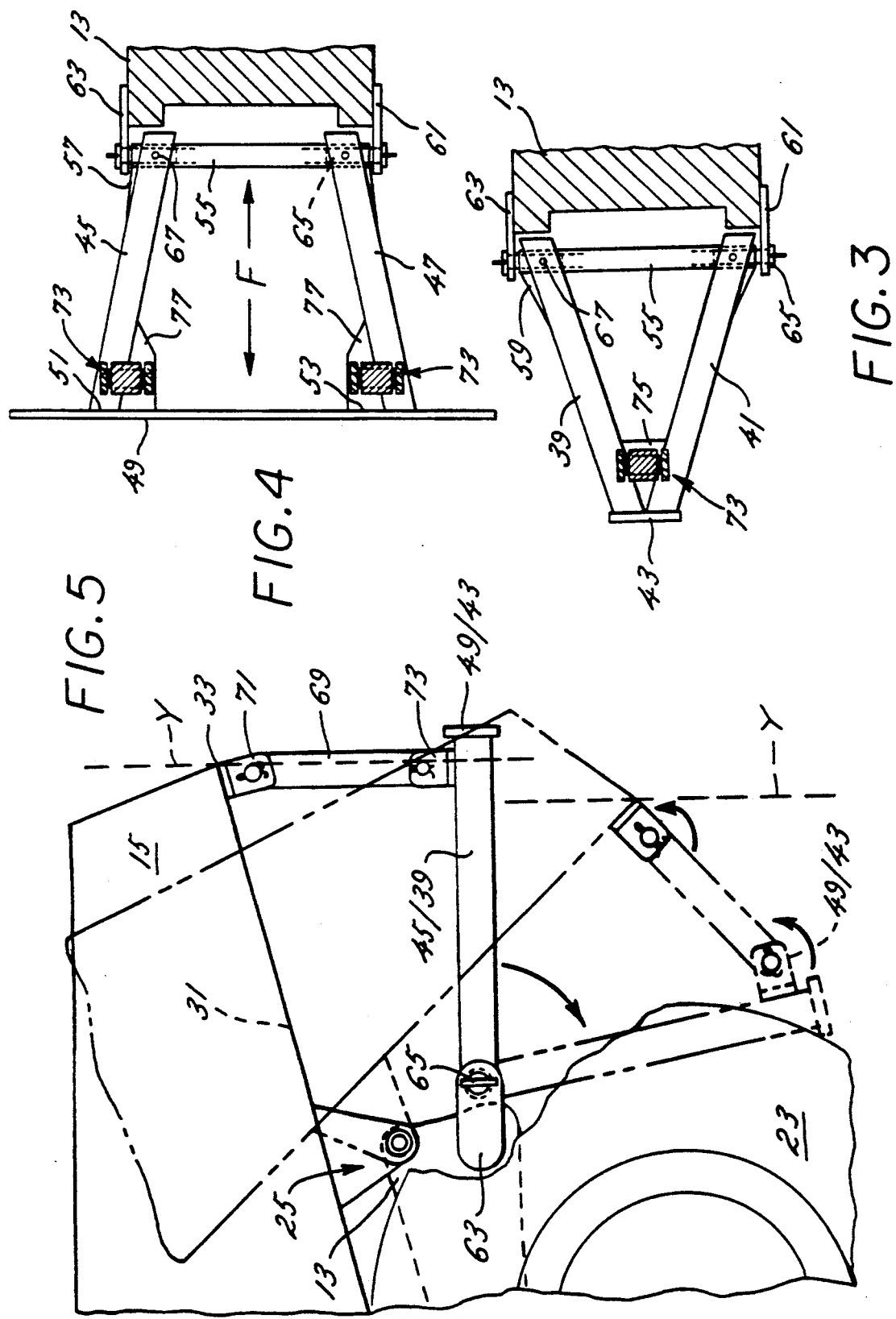

METHOD FOR A UTILITY EXTENSION OF AN OFF-ROAD VEHICLE HAVING A DUMP BODY

RELATED APPLICATIONS

This is a continuation of U.S. patent application Ser. No. 07/238,725, filed Aug. 30, 1988 now abandoned.

TECHNICAL FIELD OF THE INVENTION

The invention generally relates to heavy-duty, off-road vehicles, and more particularly relates to such vehicles having dump bodies pivotably mounted to the vehicle frame.

BACKGROUND OF THE INVENTION

Heavy-duty, off-road vehicles such as a HD-1200M by Komatsu or a Volvo BM A25 are typically used to transport earthen loads in work areas such as open pit mines and the like. Such work areas vary in condition, depending primarily upon the geographic features of the land, the local climate and day-to-day changes in weather. Although heavy-duty, off-road vehicles are designed to operate over a wide variety of terrain and under all types of climatic conditions, it is not unknown for the vehicles to lose traction and require assistance. To free a vehicle, a chain or cable can be rigged to the vehicle for pulling it from the area causing the problem. Although this approach may ultimately prove successful in freeing the vehicle, it is a time-consuming and sometimes dangerous operation. In part because of the foregoing reasons, rigging a chain to the vehicle is often not done; instead, a bulldozer or similar type vehicle is used to push the stuck vehicle from behind. This necessarily results in the bulldozer pushing on the body since the frame is not accessible from the back.

The dump bodies of heavy-duty, off-road vehicles are not designed to accept the application of horizontal forces from the rear of the body which naturally results from pushing on the body. Besides damage to the bed of the body, the pivot assemblies joining the body to the frame experience forces which are generally transverse to the direction of the force they are designed to withstand. Such transverse forces can cause significant damage to the pivot assemblies.

Pushing on the rear of the dump body could be avoided if the frame of the vehicle extended to the same posterior area as occupied by the end of the body. In this connection, bumper-type extensions of the frame have traditionally been viewed as unpractical since it is necessary that the area under the dump body and to the rear of the pivot for the body be clear so as to allow rotation of the body during dumping of a load. If rear bumper-type extensions are impractical, front bumpers are of little value since it is highly unlikely for two vehicles to collide head-on. Operation of off-road, heavy-duty vehicles without bumpers, however, does represent a significant danger. Specifically, the relatively high elevation of the dump body and the overhang of the posterior portion of the body past the frame can damage the cab of a vehicle which collides with the back of another vehicle. Moreover, the end of the body can be at the level of the operator and possibly cause serious physical injury.

SUMMARY OF THE INVENTION

It is the primary object of the invention to provide a method for transferring forces to and from a heavy-duty, off-road vehicle via a posterior portion of the vehicle's frame without damaging or risking damage to the dump body of the vehicle and without interferring with the dumping of a load from the dump body.

It is a more detailed object of the invention to provide a method for pushing or pulling an off-road, heavy-duty vehicle or allowing the vehicle to pull from its posterior area without damaging the dump body and without interferring with the load dumping function.

It is a related object of the invention to provide a method for protecting the posterior area of a heavy-duty, off-road vehicle from damage caused by accidental collisions with other vehicles or objects in the work area and to provide such protection without interferring with normal dumping of a load. In this connection, it is a primary object of the invention to prevent damage to the cab area of a heavy-duty, off-road vehicle and associated operator injury when a front of one vehicle collides with the back of another.

Other objects and advantages of the invention will be apparent from the following summary of the invention and from the following detail description of the preferred embodiments taken with the accompanying drawings.

Briefly, a bar assembly, or a bumper assembly, is pivotably mounted to a posterior portion of a frame for a heavy-duty, offroad vehicle and operatively coupled to a dump body of the vehicle. With the dump body in a fully lowered position on the frame of the vehicle, the bar assembly extends substantially horizontally from the frame to an area which is proximate to a vertical plane passing through the most posterior portion of the dump body. In this horizontal position, the bar assembly is used to transfer forces to and from the frame without placing a mechanical stress on the dump body or the coupling joining the bar assembly and the body. Rotation of the body pivots the bar assembly to an out-of-the-way position which does not interfere with the dumping of a load carried by the body. In an out-of-the-way position, the bar assembly is entirely forward of the most posterior portion of the body in its fully raised position.

Preferably, the bar assembly comprises a pair of beams mounted to the frame at their first ends for rotation about a common axis. The beams are joined at their second ends by a transverse beam which preferably has a flat face for receiving an applied force. In the horizontal position of the bar assembly, the flat face of the transverse beam is substantially vertical so that an applied force can be most easily spread across the entire face of the beam.

A multi-jointed linkage couples the bar assembly to the dump body and holds the bar assembly in its substantially horizontal position when the body is fully lowered on the frame. By providing two pivot joints in the linkage, a horizontal force applied to the bar assembly does not place a stress on the linkage. More importantly, the pivot joints allow the bar assembly to respond to rotation of the dump body for the purpose of pivoting to an out-of-the-way position. In practice, the force communicated by the bar assembly may not be entirely in a horizontal direction and some vertical component of the force may be experienced. Although this vertical component of the force is transferred to the dump body via the multi-jointed linkage, the construction of the dump body is designed to handle such forces since loads placed into the body are also vertical forces.

Depending upon the primary use of the bar assembly, the beams which are pivotably mounted to the frame may extend past the vertical plane including the most posterior portion of the dump body. For example, if the primary use of the bar assembly is as a back bumper for a vehicle, the bar assembly should extend slightly past the vertical plane. It cannot, however, extend so far past the vertical plane that it cannot be rotated to a position where it is entirely forward of the plane when the body dumps. Also, the transverse beam of the bar assembly may be extended to provide a vehicle balancing function during the dumping of a load. In rotating the bar assembly to an out-of-the-way position during dumping, the transverse beam is brought to a position proximate to the ground. In such a position, side-to-side tilting of the frame can be tempered since too much tilting of the frame will cause one end of the transverse beam to contact the ground surface and limit further tilting so as to reduce the possibility of vehicle tipping while dumping.

BRIEF DESCRIPTION OF THE DRAWINGS

FIG. 2 is a perspective view from the rear of the exemplary heavy-duty, off-road vehicle of FIG. 1 incorporating a utility extension according to a second embodiment of the invention;

FIG. 3 is a plan view taken along the lines 2-2 in FIG. 1 of a bar assembly of the utility extension which serves as the primary member for transferring forces to and from the frame of the vehicle;

FIG. 4 is a plan view taken along the lines 4-4 in FIG. 2 of a bar assembly for the second embodiment of the utility extension which serves as the primary member for transferring forces to and from the frame of the vehicle; and FIG. 5 is an enlarged and partial side view of the heavy-duty, off-road vehicle of FIG. 1, showing the alternative positions of the utility extension with the dump body of the vehicle in either its fully lowered position (solid line) or its fully raised position (dashed line).

Figure 1:
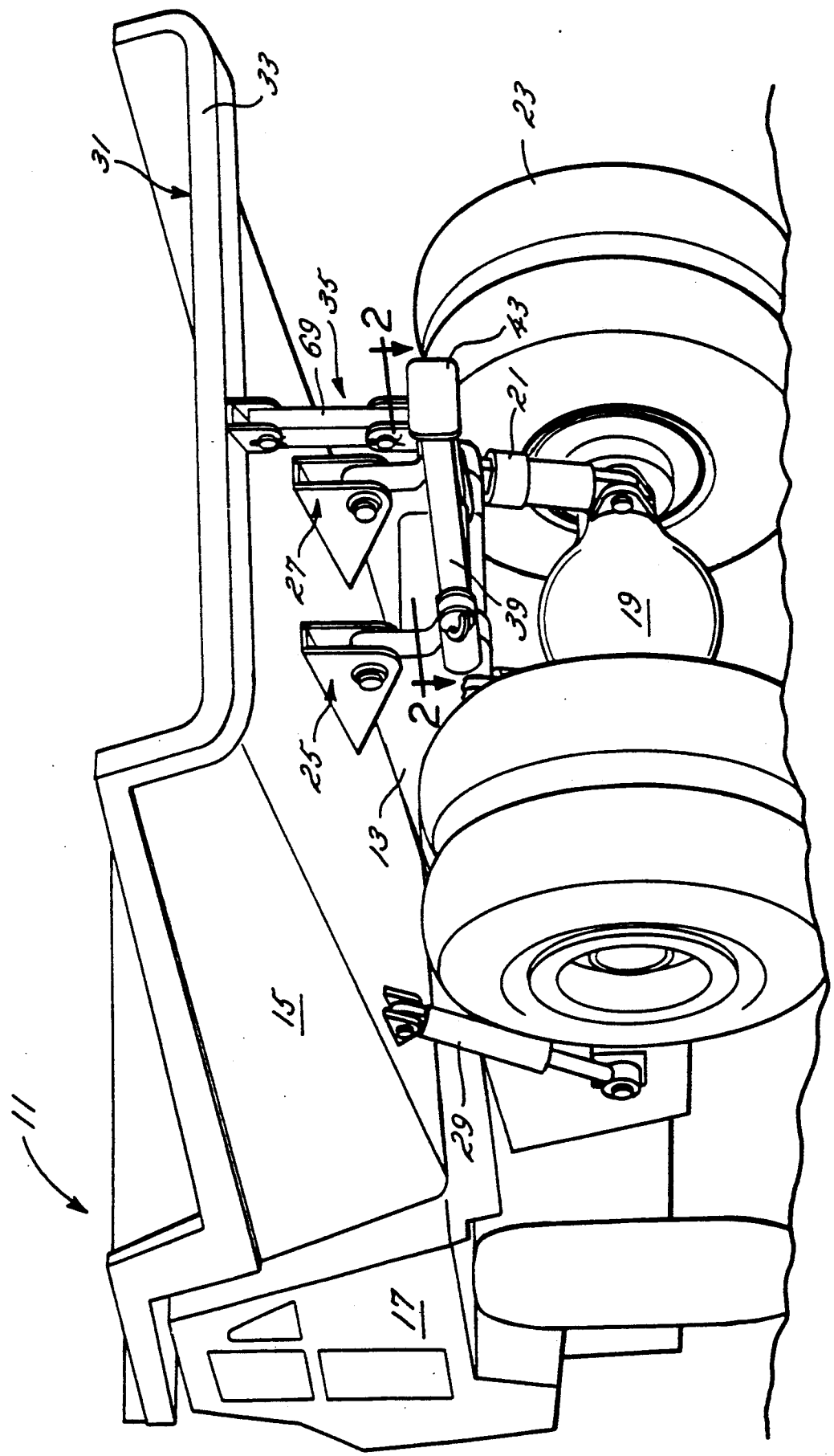
FIG. 1 is a perspective view from the rear of an exemplary heavy-duty, off-road vehicle incorporating a utility extension according to a first embodiment of the invention mounted to the frame of the vehicle and coupled to the dump body of the vehicle for rotation in response to rotation of the dump body.

While the invention will be described in connection with several preferred embodiments, it will be understood that the following detailed description is not intended to limit the invention to the particular embodiments illustrated. On the contrary, it is applicant's intention to cover all alternatives and equivalents as may be included within the spirit and scope of the invention as defined by the appended claims.

DETAILED DESCRIPTION OF THE PREFERRED EMBODIMENTS

Turning to the drawings and referring first to FIG. 1, an exemplary heavy-duty, off-road vehicle 11 is illustrated, having a frame 13, dump body 15 and cab 17. The frame is supported over a rear axle 19 by suspension cylinders 21 (only one is illustrated). Typically, these vehicles are very large, with tires 23 having diameters that can exceed ten feet. To pivot the dump body 15, it is mounted to the frame 13 by way of pivot assemblies 25 and 27. A hydraulic piston 29 is coupled between the frame 13 and body 15 on each side of the vehicle 11 for rotating the body between lowered and raised positions.

As in all dump body vehicles, the pivot assemblies 25 and 27 are located at the end of the frame 13. Typically, the bed of the dump body extends rearwardly beyond the end of the frame. In the illustrated embodiment, the bed 31 of the dump body 15 is a duck-tail-type body which extends substantially beyond the end of the frame. This overhang of the bed 31 ensures the load carried by the vehicle is dumped clear of the rear axle 19 and tires 23. Also, the overhang helps in distributing the load on the frame. The overhang, however, also prevents easy access to the frame for pushing or pulling the vehicle. Furthermore, the overhang is dangerous in that a collision with another vehicle may result in the rear edge 33 of the body damaging a cab of another vehicle in an area which can be very expensive to repair. In effect, the rear edge 33 of the body 15 acts as a bumper for the posterior of the vehicle 11, but its high elevation causes it to meet the cab of another vehicle in an area that is relatively unprotected and fragile.

In accordance with the invention, a utility extension is coupled to the frame 13 of the vehicle 11 so as to effectively extend the frame to a posterior area of the vehicle which is proximate to a vertical plane passing through the rear edge 33 of the bed 31 of the dump body 15. The utility extension is pivotable in response to the rotation of the dump body 15 for moving to an out-of-the-way position which does not interfere with the rotation of the dump body and the dumping of a load. In its in-use position, the utility extension has a number of applications, hence the name "utility" extension. For example, the extension may be used as a push bar to free a vehicle from a no-traction area. It can be used as a tow bar for pulling or backstop for dumping. If used for pulling, a hitch assembly (not shown) may be added to the extension. Also, the utility extension can serve as a bumper assembly by itself or in conjunction with an extension of the frame on the front of the vehicle. The utility extension can also find application as an outrigger for aiding in the maintenance of the balance of the vehicle 11 during dumping.

Primarily comprising the utility extension is a bar assembly having at least one bar rotatably mounted at one end to the frame 13 of the vehicle 11, and the second end extending posteriorly to an area proximate to a vertical plane including the rear edge 33 of the dump body 15. A second bar is connected to the second end of the first bar so as to be substantially transverse to the first bar. This second bar presents a relatively flat face for application of a force to the assembly. If the length of the second bar is sufficient, the assembly may serve as an outrigger which aids in the side-to-side stability of the vehicle 11 as it dumps a load since the second bar is lowered close to the ground surface as the dump body rotates to its fully raised position as explained hereinafter.

FIGS. 1 and 2 illustrate utility assemblies 35 and 37, respectively, of slightly different constructions. In FIG. 1, the bar assembly comprises two bars 39 and 41 as best seen in FIG. 3 which extend from the frame 13 along converging paths. The transverse bar connecting their second ends is a plate 43 which presents a flat vertical surface for applying a pushing force. The relatively small area of the face of the plate 43 of the bar assembly in FIGS. 1 and 3 is believed to be adequate if the utility extension 35 is used primarily or exclusively as a push bar. In contrast to the embodiment of FIGS. 1 and 3, FIGS. 2 and 4 illustrate a bar assembly comprising two bars 45 and 47 extending from the frame 13 along paths which are diverging. The second ends of the bars 45 and 47 are spaced so as to provide a broad support for a long transverse bar which is illustrated as a flat plate 49 joining the two ends 51 and 53. In practice, applicant believes it may be preferred to employ a tubing in place of the flat plate 49 because of the tubing's superior strength characteristics. The relatively large facial area of the plate 49 (or a tubing) in the embodiment of the bar assembly in FIGS. 2 and 4 is believed to be best suited if the utility extension is primarily intended to function as a bumper or outrigger.

In order to rotatably mount each of the bar assemblies of FIGS. 1-4 onto the frame 13, a hollow tube 55 is received by aligned bores (not shown) in the first ends of the bars 45,47 or 39,41. The tube 55 is welded in place and support flanges 57 or 59 may be added to increase the structural integrity of the junctions between the bars and tube. A pair of brackets 61 and 63 are welded to the sides of the frame 13, and they each include a bore (not shown) for receiving a pivot pin 65. The pivot pins 65 are inserted into the ends of the hollow tube 55 in order to complete the mounting of the bar assembly to the frame 13. In order to ensure the pivot pins stay in place, bolts 67 are passed through aligned bores in the bars 45,47 or 39,41, tube 55 and pivot pins 65 and a nut (not shown) is secured to the end of each bolt extending out of the bore.

By comparing the mountings of the bar assemblies in FIGS. 3 and 4, it can be appreciated that the mountings for the bar assemblies of the two illustrated embodiments are exactly the same. Accordingly, the brackets, tubing and pivot pins of both embodiments have been described together and identified by the same numerals.

Horizontal forces (F) to or from the frame 13 are directed along the length of the bars 39 and 41 of the first illustrated embodiment and bars 45 and 47 of the second illustrated embodiment so as to effectively extend the frame to the same posterior region as the end 33 of the body 15. Not only must the mounting brackets 61 and 63 and the tubing 55 allow for the rotation of the bar assemblies, they must also provide for the transfer of a force between the bar assemblies and the frame 13. Therefore, the brackets 61,63, tubing 55 and pivot pins 65 must be of sufficient gauge or thickness to ensure that the magnitudes of forces expected to be transferred will not cause high stress and resulting yielding at any area.

In keeping with the invention, the bar assemblies are maintained in an approximately horizontal position which is parallel to the ground by a multijointed linkage coupling the bar assemblies to the underside of the bed 31 of the dump body 15. As a practical matter, any force (F) applied to or taken from the frame 13 via the bar assemblies will include a vertical component that transfers to the dump body 15 via the multi-jointed linkage. However, the magnitudes of the vertical component of the force (F) can be expected to be nominal. Also, the body 15 and its pivot assemblies 25 and 27 are designed to accommodate some vertical forces that typically originate from the weight of a load. As contemplated, the linkage may be realized by a roller assembly which allows for relative movement of the utility extension and the body 15 during dumping. Such a roller assembly would include a rigid bar extending down from the body 15 and mating with the bar assembly via top and bottom rollers. Alternatively, a simple pivot linkage may suffice. Because of its simplicity, applicant prefers the latter approach.

In the illustrated embodiments, the multijointed pivot linkage is realized by a unitary bar 69 spanning two bracket assemblies 71 and 73. In the embodiment of FIGS. 1 and 3, only a single linkage is needed, whereas the embodiment of FIGS. 2 and 4 requires two linkages. To provide a welding base for the bracket assembly 73 secured to the bar assembly, a plate 75 spans the two bars 39 and 41 in FIG. 3. Similarly, each of the bars 45 and 47 in FIG. 4 is associated with a plate extension 77 that provides a base for the bracket assembly 73. The other bracket assembly 71 in a pair forming a linkage is welded to the underside of the bed 31 of the body 15 so as to be in the plane of rotation of the unitary bar 69. The axes of rotation defined by pivot pin 65 and bracket assemblies 71 and 73 are parallel in order to allow for a non-binding rotation.

In response to the rotation of the dump body 15, the multi-jointed linkage allows the bar assembly to rotate about an axis of rotation corresponding to the axis of pivot pin 65. Because the axes of rotations of the bar assembly and the dump body 15 are distinct, relative movement occurs between the bar assembly and body. To account for this relative movement, the unitary bar 69 of the multi-jointed linkage rotates in its brackets 71 and 73 as can be seen in FIG. 5. Specifically, as the bar assembly rotates in one direction, the bar 69 of the multijointed linkage in the illustrated embodiment rotates in the opposite direction relative to each of the bracket assemblies 71 and 73. If the axis of rotation for the bar assembly is above the axis of rotation for the dump body, the direction of rotation for the bar 69 may be different than that illustrated.

In the illustrated embodiments, the plates 43 and 49 extend beyond a vertical plane Y including the end 33 of the bed 31 of the body 15 when the body is in its fully lowered position. In the fully raised or dumped position shown in phantom line in FIG. 5, the bar assembly and its plate 43 or 49 have been rotated to a position wherein they are entirely forward of the vertical plane Y including the end 33 of the bed 31 of the body 15. Rotating the entirety of the bar assembly to a position forward of the end 33 of the bed 31 is an important feature of the invention since it ensures that the utility extension does not interfere with the dumping function. When rotated into its out-of-the-way position shown in phantom line in FIG. 5, the plate 49 may be rotated close to the ground, depending on the mounting positions of bracket assemblies 71 and 73. If rotated close to the ground, the plate 49 may be utilized as an outrigger for stabilizing side-to-side tilting of the vehicle 11 as it dumps.

From the foregoing, it will be appreciated that the invention provides a utility extension which essentially brings the frame 13 of the vehicle 11 back to the same posterior area occupied by the end 33 of the body 15 and does so without interfering with the dumping process or modifying the pivot axis of the body. The extension is pivotable in response to rotation of the dump body so that it is automatically moved to an out-of-the-way position when the body is raised to dump a load. The extension can be easily retrofitted onto conventional off-road, heavy-duty vehicles without necessitating modification of the existing frame. Furthermore, the design for the utility extension does not require complex gearing or electromechanical aids for rotation. In this connection, it is highly reliable and requires very little maintenance.

I claim:

1. A method of preventing serious injury to the operators of heavy-duty, off-road vehicles resulting from collisions between a most posterior portion of a ducktail-type dump body of a first vehicle and any portion of a second vehicle, the method comprising the steps of:

extending a bumper assembly that is pivotally secured to a frame of the first vehicle such that a free end of the bumper assembly is positioned proximate to a first vertical plane including the most posterior portion of the ducktail-type dump body when the dump body is in a lowered position;

colliding the first and second vehicles;

conducting a force resulting from the collision along at least one rigid horizontal bar of the bumper assembly and directly to the frame, wherein the horizontal bar provides an unyielding barrier between the most posterior portion of the ducktail-type dump body of the first vehicle and any portion of the second vehicle;

preventing the most posterior portion of the ducktail-type dump body of the first vehicle from seriously damaging the second vehicle, regardless of which vehicle is moving towards the other vehicle; and mechanically linking the dump body and the bumper assembly such that when the dump body is rotated into a raised position the free end is forward of a second vertical plane including a most posterior portion of a bed of the dump body.

2. A method as set forth in claim 1 wherein said force is transferred to said frame from a vehicle pushing on or colliding with said bumper assembly.

3. A method as set forth in claim 1 wherein the bumper assembly includes a flat plate affixed to the free end of the bumper assembly, whereby the flat plate receives the force from the collision.

4. In a heavy-duty, off-road vehicle having a dump body pivotally mounted to a frame, a bumper assembly comprising: a bar assembly including first and second bar means joined in a substantially traverse relationship wherein said first and second bar means are each comprised of at least one bar; means for pivotally mounting a first end of said first bar means to said frame so that a force delivered along the length of said first bar means may be absorbed by said frame without effecting the pivoting ability of said first bar means; and multi-jointed linkage means connecting said bar assembly to said dump body in an area of said dump body which is posterior of a hinge assembly joining said frame and body such that said bar assembly pivots about said mounting means in response to the pivoting of said dump body about said hinge assembly; a method of aiding stability during the dumping of a load carried by said dump body using said bumper assembly comprising the steps of:

rotating said dump body to a fully raised position;

rotating said bar assembly in response to the rotation of said dump body so as to bring said second bar means in proximity to a ground surface and approximately parallel thereto;

producing a lateral force applied to said dump body in response to a weight of said load being dumped from said dump body; and engaging said second bar means with said ground surface to resist tilting of said dump body in response to the lateral force being applied to said dump body.

5. The method as defined in claim 4, wherein a plate is attached to the second end of said second bar means, and said plate engages the ground surface to prevent tilting of said dump body.

* * * * *